Sept. 18, 1934.　　　J. ZUBATY　　　1,973,838
TEMPERATURE INDICATOR
Filed June 8, 1928
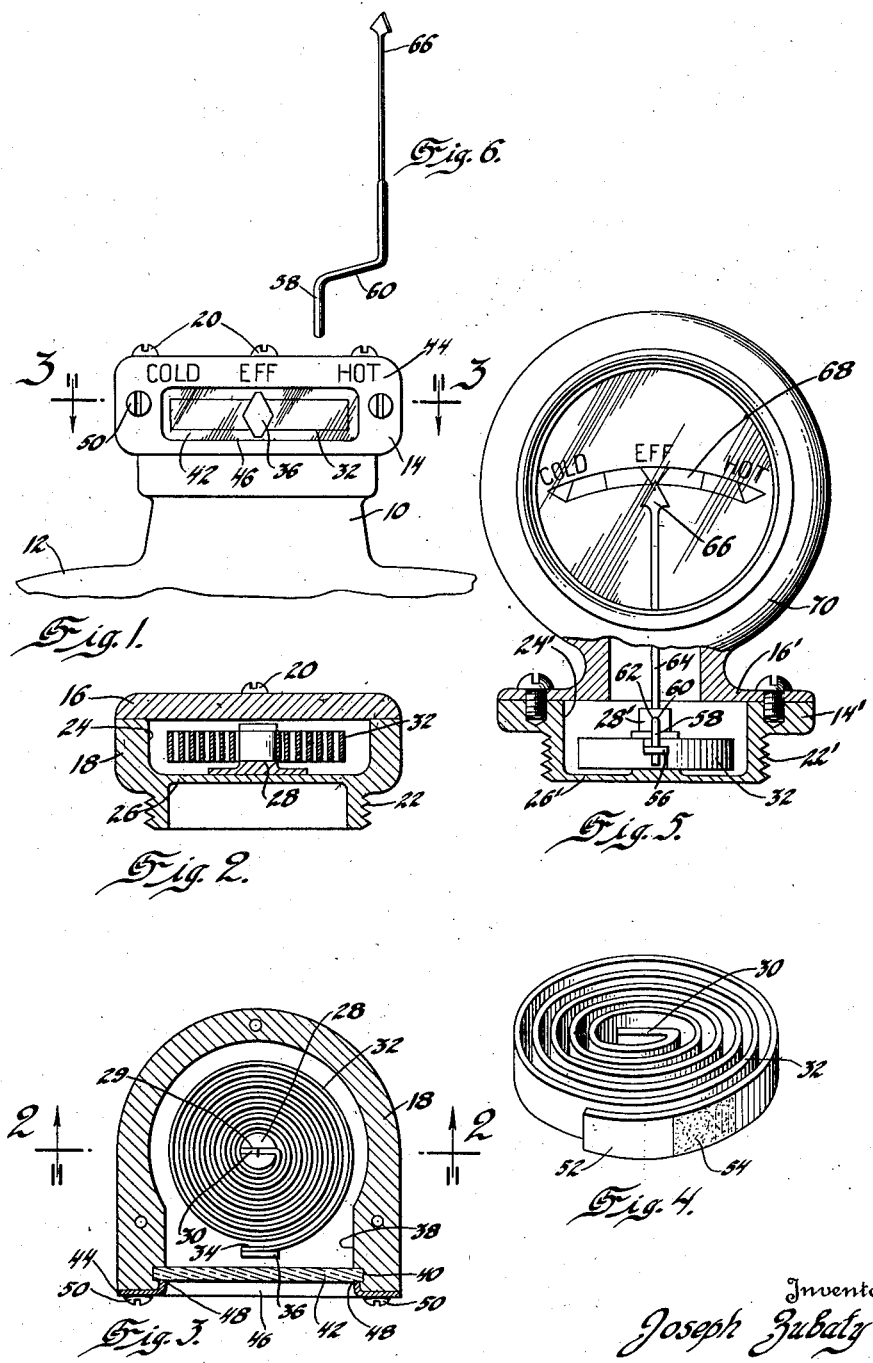

Patented Sept. 18, 1934

1,973,838

UNITED STATES PATENT OFFICE 1,973,838

TEMPERATURE INDICATOR

Joseph Zubaty, Flint, Mich., assignor, by mesne assignments, to General Motors Corporation, Detroit, Mich., a corporation of Delaware Application June 8, 1928, Serial No. 283,994

12 Claims. (Cl. 73—118)

This invention relates to temperature or heat indicators and has particular reference to indicators as applied to the radiator cap of internal combustion engines of automotive vehicles.

In the past, temperature or heat indicators applied to the radiator cap have been in the form of mercurial thermometers or devices which indicate heat changes by means of a heat sensitive paint. These prior devices are relatively costly compared with the indicator of the present invention, and are exposed to direct contact with the vapor and liquid of the water circulating system. The vapor and liquid get between the joints and cause damage through rust or produce deleterious and disagreeable effects due to leakage.

It is the object of the present invention to construct a temperature indicator which will eliminate the objections of prior indicators and give results which are produced in a very simple way, and which results will be equally as accurate. The device of the present invention has the additional advantage of being extremely compact and not subject to the direct contact with the vapors and water of the liquid in the engine cooling system.

The object of the invention is accomplished by constructing a special form of radiator cap which includes a housing or chamber having a relatively thin wall which separates the temperature indicator element from the water of the cooling system. Within this housing there is rigidly mounted on a central post, the inner end of a bi-metallic heat sensitive spiral, the outer end of which is free and has attached thereto a suitably shaped plate or index which is adapted to move to and fro at a window at the rear of the radiator cap as the spiral expands or contracts due to heat changes. The position of this index or plate at the window will show the thermal condition of the water in the radiator.

As a modification of the principal species, the end of the spiral may be painted or colored with a white and a red space and as the heat rises the expansion of the thermo sensitive element will bring more and more of the red surface in front of the window. The proportion of the red surface visible will indicate the thermal condition of the water.

A still further object of this invention is to provide a device for indicating temperature conditions in automobile radiators which is entirely embodied within the radiator cap without projecting above or below the limiting planes which define the top and bottom of the radiator cap.

As a further modification, I may press a lug from the free end of the heat sensitive spiral and fasten in this lug the bent end of a rod which is pivoted in an extension of the central post to which the mid portion of the heat sensitive spiral is rigidly united. The opposite end of the rod will be formed in the shape of a pointer which will swing over a scale to indicate the thermal condition of the water in the radiator.

In the drawing:

Figure 1 is a rear elevation of the radiator cap of an automotive vehicle showing the invention applied thereto.

Figure 2 is a section through the radiator cap taken substantially on the line 2—2 of Figure 3.

Figure 3 is a section through the radiator cap taken on the line 3—3 of Figure 1.

Figure 4 is a perspective view of a bi-metallic heat sensitive spiral, a modification of the species in Figure 1.

Figure 5 shows a further modification.

Figure 6 is a perspective view of the needle of Figure 5.

Referring to the drawing, the numeral 10 indicates the dome of a radiator 12 of an internal combustion engine. 14 is the radiator cap which is of a special form in order to adapt it to the present invention.

The cap 14 comprises the plate or wall forming the upper head portion 16 and the lower housing portion 18 which are removably held together by means of the screws 20. The lower portion 18 has a screw threaded shank extension 22 which screws into the dome 10 of the radiator.

The plate or wall or upper portion 16 and lower portion 18 of the cap 14 form a chamber or housing 24 which is kept out of contact with the vapors and water of the radiator by means of the relatively thin lower wall or partition 26.

Fixed to the center of the lower wall 26 is the post 28 which extends upwardly and to the central portion of which there is secured in a slot 29 the bent end 30 of a bi-metallic heat sensitive element 32, the outer end 34 of which is free and has secured thereto the index or plate 36.

The rear portion of the radiator cap is open as shown at 38 and over this opening 38 within grooves 40 in the lower portion 18 of the cap 14 there is positioned the transparency 42, preferably glass, and over the rear side of both upper and lower portions 16 and 18 there is applied the plate 44 having the central opening 46 (to conform to the opening 38), and the inwardly bent flange 48 which abuts against the transparency 42. The plate 44 is removably held to the cap 14 by means of the screws 50.

Referring to Figure 4, it will be seen that instead of fastening a plate or index 36 to the free end of the bi-metallic heat sensitive element, I may use painted surfaces, such as a white surface at 52 and a red surface at 54. When the water in the circulating system is cold, the white surface 52 will be visible, however, as the water heats up, the bi-metallic element 32 will expand so as to bring more and more of the red surface 54 in front of the transparency 42. The proportion of the red surface 54 which is visible through the transparency 42 will determine the thermal condition of the water in the engine radiator.

Referring to the species in Figure 5, it will be seen that the wall 26' which separates the housing 24' from the water in the radiator is positioned farther down on the threaded extension 22' of the cap 14". This permits of a longer post 28" which is necessary in the present species.

In Figure 5, the free end of the bi-metallic heat sensitive element 32 has a lug 56 pressed therefrom, and in this lug there is held a bent end 58 of a rod 60 journalled in an opening 62 in the post 28'. The opposite end 64 of the rod 60 is bent into the shape of a pointer as shown at 66, which pointer is adapted to swing over a scale 68 formed on an extension 70 of the upper portion 16' of the cap 14'. As the bi-metallic heat sensitive element 32 expands or contracts, due to changes in temperature of the water, it will cause the lug 56 to swing the bent end 58 of the shaft 60 and accordingly give a swing to the pointer 66 of the opposite end 64. The position of this pointer on the dial 68 will indicate the thermal condition of the water in the radiator.

In the disclosure as shown in Figures 2 and 5, it will be noted that the dividing wall 26 or 26' prevents direct contact of the water vapor or water in the radiator with the heat sensitive element 32, which is generally of flat form and is positioned in a horizontal plane.

I claim:

1. In a radiator cap of the type described the combination comprising a cup shaped member, a detachable wall therefor to provide a closed chamber, said cup shape member having an opening therein which is closed by a transparent element, an indicator within said chamber and means within the chamber and connected to the indicator element for moving it under changes in temperature so as to change its position with reference to said opening dependent upon temperature conditions.

2. In a device of the type described, the combination with a flat radiator cap, comprising a body having an opening therein and a plate detachably secured to said body to form a closed chamber, of means within the chamber for giving a visible indication through said opening, of the temperature conditions within the radiator to which the cap is to be applied, the vertical extent of the complete device being defined by the top of the radiator cap and the lower edge thereof.

3. In a device of the type described, the combination with a flat radiator cap having an opening therein and a partition within said cap to form a closed chamber, of means within the chamber for giving a visible indication through said opening of the temperature conditions within the radiator to which the cap is to be applied, the vertical extent of the complete device being defined by the top of the radiator cap and the lower edge thereof.

4. In a radiator cap of the type described, a flat container having an opening therein covered by a transparent element, a movable indicator element within the container, heat influenced means connected to said movable indicator element for rendering it more or less visible through said opening depending upon the temperature conditions to which the heat influenced element is subjected, said indicator element and said heat influenced means lying wholly within said flat container.

5. In a temperature indicating radiator cap having a chamber therein, a heat sensitive flat horizontally positioned spiral inclosed in said chamber, means for securing the inner end of the spiral against movement, the outer end being free, and indicating means on the spiral's free end the position of which indicates the temperature of the water in the radiator.

6. In combination with a radiator cap having a chamber therein, a temperature indicator comprising a heat sensitive horizontally positioned metallic spiral within said chamber, means to secure said spiral at one end in the radiator cap, the opposite end of said spiral being free, indicating means on said free end the position of which means indicates the temperature of the water in the radiator and a transparent front in said radiator cap to render the last named means visible.

7. In combination with a radiator cap having a chamber therein, a temperature indicator comprising a heat sensitive horizontally positioned metallic spiral within said chamber, a post centrally positioned in said chamber to secure said spiral at one end, the opposite end of said spiral being free, and indicating means on said free end the position of which means indicates the temperature of the water in the radiator.

8. In combination with a radiator cap having a chamber therein, a temperature indicator comprising a heat sensitive horizontally positioned metallic spiral within said chamber, means to secure said spiral at one end in said chamber, the opposite end of said spiral being free, and an index secured on said free end the position of which index indicates the temperature of the water in the radiator.

9. In a temperature indicating radiator cap having a chamber therein, a heat sensitive flat horizontally positioned spiral inclosed in said chamber to prevent direct contact with the vapors and water of the engine cooling system, a post extending from one wall of said chamber for securing the inner end of the spiral, the outer end being free, and indicating means on the spiral's free end the position of which indicates the temperature of the water in the radiator.

10. In a temperature indicating radiator cap having a chamber therein, a heat sensitive flat horizontally positioned spiral inclosed in said chamber to prevent direct contact with the vapors and water of the engine cooling system, a post extending upwardly from the bottom wall of said chamber for securing the inner end of the spiral, the outer end being free, and indicating means on the spiral's free end the position of which indicates the temperature of the water in the radiator.

11. In a temperature indicating radiator cap having a chamber therein, a heat sensitive flat horizontally positioned spiral inclosed in said chamber to prevent direct contact with the vapors and water of the engine cooling system, means in said chamber for securing the inner end of the spiral, the outer end being free, indicating means on the spiral's free end the position of which indicates the temperature of the water in the radiator, and a window at the rear of said radiator cap to observe the movements of said last named means.

12. In a temperature indicating radiator cap having a chamber therein, a heat sensitive flat horizontally positioned spiral inclosed in said chamber to prevent direct contact with the vapors and water of the engine cooling system, means in said chamber for securing the inner end of the spiral, the outer end being free, and indicating means on the spiral's free end the position of which indicates the temperature of the water in the radiator.

JOSEPH ZUBATY.